United States Patent
Golightly

[11] Patent Number: 5,567,269
[45] Date of Patent: Oct. 22, 1996

[54] TIRE BEAD MAKING APPARATUS WITH TWO WINDING TENSION LEVELS

[75] Inventor: Ralph W. Golightly, Gadsen, Ala.

[73] Assignee: The Goodyear Tire & Rubber Company, Akron, Ohio

[21] Appl. No.: 325,606

[22] Filed: Oct. 19, 1994

Related U.S. Application Data

[62] Division of Ser. No. 125,523, Sep. 23, 1993, Pat. No. 5,385,621.

[51] Int. Cl.$^6$ .................. B29D 30/48; B32B 31/00
[52] U.S. Cl. .................. 156/361; 156/422; 156/495; 242/419.3; 242/419.9; 242/150 M
[58] Field of Search ...................... 156/422, 136, 156/361, 494–495; 245/1.5; 242/419.3, 419.9, 150 M; 140/88, 92.2

[56] References Cited

U.S. PATENT DOCUMENTS

| | | | |
|---|---|---|---|
| RE. 27,547 | 1/1973 | Lang ........................... | 156/422 |
| 1,633,620 | 6/1927 | Alderfer ...................... | 156/422 X |
| 1,738,018 | 12/1929 | Pfeiffer et al. . | |
| 1,749,899 | 3/1930 | Alderfer . | |
| 1,813,176 | 7/1931 | Leguillon . | |
| 1,876,375 | 9/1932 | Wikle .......................... | 156/422 X |
| 1,881,276 | 10/1932 | Humphrey ................... | 156/136 |
| 1,906,303 | 5/1933 | Andrews ...................... | 156/422 |
| 1,913,336 | 6/1933 | MacMonagle . | |
| 1,927,811 | 9/1933 | Stevens ........................ | 156/422 |
| 2,014,359 | 9/1935 | Morrison ..................... | 156/42.2 X |
| 2,049,587 | 8/1936 | Lehman et al. ............... | 156/422 X |
| 2,902,083 | 9/1959 | White .......................... | 156/136 |
| 2,979,109 | 4/1961 | Dieckmann .................. | 156/422 |
| 3,251,384 | 5/1966 | Vanzo .......................... | 156/422 X |
| 3,330,491 | 7/1967 | Williams ...................... | 156/422 X |
| 4,098,316 | 7/1978 | Carvalho . | |
| 4,202,717 | 5/1980 | Seiberling . | |
| 4,378,042 | 3/1983 | Inae et al. . | |
| 4,435,236 | 3/1984 | Inac et al. ................... | 156/422 X |
| 4,597,157 | 7/1986 | Ichikawa .................... | 156/422 X |
| 4,724,873 | 2/1988 | Abe ............................ | 156/422 X |
| 4,808,196 | 2/1989 | Smith . | |
| 5,228,942 | 7/1993 | Kokui et al. ................. | 156/422 |

FOREIGN PATENT DOCUMENTS

| | | |
|---|---|---|
| 0344928A3 | 12/1989 | European Pat. Off. . |
| 2606003 | 5/1988 | France . |

*Primary Examiner*—Adrienne C. Johnstone
*Attorney, Agent, or Firm*—Frederick K. Lacher

[57] ABSTRACT

A plurality of helically wound tire beads are made by winding them on a forming wheel at two predetermined tension levels. The tension levels are generated by a braking pulley and metallic particle brake in conjunction with a programmable logic controller. The first few turns of wires are made at a relatively low tension level. Subsequent turns are made at a higher tension level. The lower tension level contributes to longer life of the forming wheel assembly.

6 Claims, 1 Drawing Sheet

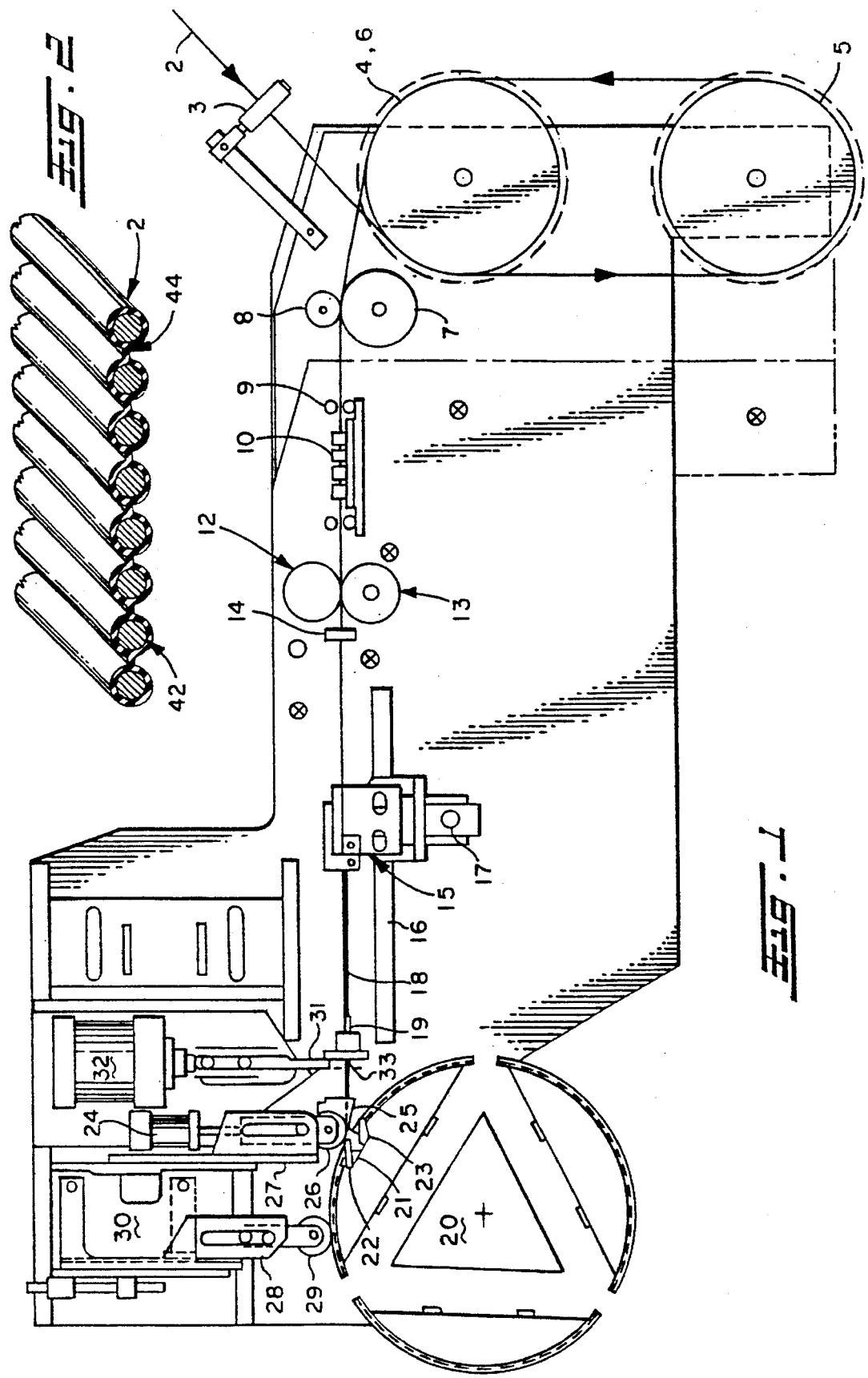

TIRE BEAD MAKING APPARATUS WITH TWO WINDING TENSION LEVELS

This is a Division, of patent application Ser. No. 08/125,523 filed Sep. 23, 1993 now U.S. Pat. No. 5,385,621.

This invention relates to a method and apparatus for forming tire beads, and more particularly to a method and apparatus for forming a plurality of tire beads of either strap or hex configuration while reducing wear and resulting downtime on the bead making apparatus.

For example, bead making machines such as those disclosed in U.S. Pat. No. 2,902,083 include a forming drum about which a wire is wrapped a plurality of times to form the bead. The wire is maintained under tension to obtain certain performance qualities in the tire bead. Unfortunately, maintaining the requisite tension in the wire while forming the bead tends to wear out certain components of the bead making apparatus in a relatively short time, requiring expensive downtime and repair.

In current practice, each bead to be built has its own individual wire presented to the bead making apparatus. A rubber coating is extruded onto each wire at the extruder and each individual rubber-coated wire is directed to the bead making apparatus.

A problem with this approach is that the chuck of the bead making apparatus may misgrip the wire causing one or more of the wires to come loose on the festoon all the way back to the extruder. In order to operate the bead making apparatus again, the wire or wires must be restrung back through the festoon.

A more serious problem with current bead-making apparatus is that since each wire is individually coated at the extruder and each wire has its own set of festoon pulleys, there is no way to use conventional pull rolls to pull the wire out of the wire reels and through the extruder. Instead, the forming wheel of the bead-making apparatus grips the wires and pulls the wires from the let-offs and through the extruder. This manner of pulling the wires with the forming wheel contributes to three problems.

First, forming wheel gripper life is extremely short due to the fact that the gripper has to provide enough force to pull the wires through the festoon, through the extruder and out of the let-offs. Second, there is no way to control winding wire tension. Third, because of the nature of the individual wires and because the letoffs do not need to stop between each set of beads being built, the festoon must be powered when the bead builder finishes a set of beads and is being unloaded prior to starting the next set of beads. This necessitates a complex control interplay between the bead unit and the festoon.

It has been found that a new method and apparatus for providing tension in the wire can contribute to significantly improved performance of the equipment, greatly reduce downtime and increase productivity.

In accordance with one aspect of the invention, there is provided a method of making tire beads on a forming wheel which comprises the steps of coating a wire with a resilient elastomeric material, passing the wire over a braking pulley to control tension in the wire, clamping the wire and guiding it to the forming wheel, gripping a first end of the wire on the forming wheel, rotating the forming wheel a predetermined number of turns with the braking pulley providing a low resistance to turning to provide frictional adherence of the wire to the forming wheel while maintaining relatively low tension in the wire, and increasing the low resistance of the braking pulley to provide a predetermined higher tension in the wire as it is wound on the forming wheel.

In accordance with another aspect of the invention, there is provided an apparatus for making tire beads on a forming wheel which comprises a braking pulley for providing and controlling tension in a wire, first clamping means for clamping the wire and guiding it to the forming wheel, and second clamping means for clamping a first end of the wire on the forming wheel and helically winding a tire bead under an initial low tension during the initial winding and at higher tension after the initial winding in response to actuation of the braking pulley.

BRIEF DESCRIPTION OF THE DRAWINGS

FIG. 1 is a side elevation of a bead winding apparatus according to the invention.

FIG. 2 is an end view of a ribbon of wires according to one embodiment of the invention.

DESCRIPTION OF THE PREFERRED EMBODIMENT

The bead-making apparatus described herein utilizes a novel method and apparatus to supply the wires to the bead-making apparatus. A set of dies and inserts for the extruder creates a ribbon of coated wires that are connected by a small bridge of rubber between each wire. This allows conventional pull rolls and flat festoon pulleys to be used in supplying the bead wire to the bead-making machine.

The preformed ribbon is presented to the bead builder and guided by a series of guide rolls to the slitter assembly. The preformed hex ribbon is then slit apart at the bridge of rubber between each wire and the resulting individual wires are then guided into the forming wheel.

There are several advantages to this method. Since the wires are formed into a ribbon, a misgrip at the forming wheel cannot cause a wire to come loose back through the festoon. Additionally, since there are pull rolls providing the pulling force to pull the wires from the letoffs through the extruder the gripper in the forming wheel does not have to grip the wires with enough force to do all of the pulling, hence the gripper assembly lasts much longer. In some applications, gripper assemblies which formerly lasted one day now last four to six months.

Another advantage of the herein-disclosed method is the ability to automatically control the winding tension of the wires as an integral function of the building cycle. As the ribbon passes around the outer surface of a lower lead-in pulley, that pulley is direct shaft-coupled to a magnetic particle brake. The particle brake is controlled by a computer system that runs the bead building-apparatus.

The wire tension is controlled as follows: After the ribbon is slit into individual wires and presented to the forming wheel gripper. The gripper grips the wires and starts the winding cycle. At this point wire tension is about three to four pounds per wire, and the particle brake is off. After the forming wheel has made three revolutions, the computer system activates the magnetic particle brake until the retarding force on the ribbon is between twenty and twenty-two pounds per wire. This force is maintained at this level until the end of the cycle, at which time the particle brake is turned off and the cycle is ready to repeat. The use of the tension control, coupled with the previously described new aspects of the machine allows greater control during the bead-building process.

Referring to FIGS. 1 and 2, the operation of the bead-building apparatus 40 includes the following steps. In the preferred embodiment, the bead wire 42 is delivered from a festoon (not shown). The wire 42 is formed into a hex bead ribbon 2 by coating the wires 42 with rubber to form a bridge 44 between the individual wires 42. Forming the wire 42 into a ribbon 2 is not believed necessary to practice the invention although it is the presently preferred embodiment.

The ribbon 2 engages an inner, upper lead-in pulley 4 and is guided around the inner, upper lead-in pulley by guide rolls 3. The ribbon 2 next wraps around a lower pulley 5 which is coupled to a braking means such as a magnetic particle brake (not shown). Any magnetic particle brake chosen for the specific application with ordinary engineering skill should be effective and the details of such brake are not believed necessary to be disclosed here.

The magnetic particle brake is controlled by a programmable logic controller (or PLC) (not shown) which directs the apparatus 40 to build different bead configurations. The ribbon 2 exits the lower pulley 5 and travels to an upper outer pulley 6. After exiting the upper outer pulley 6, the ribbon 2 enters a one way clutch assembly 7 and hold-down rolls 8. The one way clutch assembly 7 prevents the ribbon 2 from backing up at the end of the bead building cycle. The ribbon 2 is then guided by horizontal guide rolls 9 and enters adjustable vertical rolls 10, allowing the operator of the apparatus 40 to precisely position the ribbon 2 relative to a slitter assembly 12.

With reference to FIG. 2, each slitter blade of the slitter assembly 12 (not shown) aligns with the bridge 44 of rubber which connects the adjacent bead wires 42 together. The ribbon 2 exits the adjustable rolls 10 and enters slitter assembly 12 where the slitter blades press against an anvil roll assembly 13.

With reference to FIG. 1, the ribbon 2 exits the slitter assembly 12 as individual rubber-coated wires 42 and enters divider teeth 14 which serve to keep the individual wires separated until they enter the wire gripper assembly 15. The wire gripper assembly 15 is mechanically connected to a guide rail 16 and a pneumatic cylinder which is attached at point 17. The individual wires 42 then enter and are guided along the length of a wire advance assembly 18 by slots machined in a nose piece 19.

At the start of a bead building cycle the wire gripper assembly 15 is moved toward a forming wheel 20, moving the connected wire advance assembly 18 forward toward the forming wheel wire assembly 21.

When the wire advance 18 is fully forward, a chuck gripper finger 22 is activated, gripping the wires 42 against a gripper seat 23. As the wire advance 18 moves back away from the chuck 22, a programmable logic controller signals a servo motor that drives the chuck 22 to start the wind process. The programmable logic controller also commands a jammer 30 to a down position, moving a jammer assembly 28 down and a jammer roll 29 into position directly above the chuck 22.

At the same time the programmable logic controller signals a wire guide cylinder 24 to a down position, trapping the bead wires 42 in the wire guide plate slots 25 and positioning the wires in the grooves of the wire guide rollers 26.

The chuck 22 then starts to rotate in a counterclockwise direction as shown in FIG. 1. When the chuck 22 has traveled 330 degrees, the wire guide assembly 27 starts to move in a plane perpendicular to the face of the chuck 22. As the chuck 22 reaches 360 rotational degrees, the wire guide assembly 27 completes a programmed move axially of 0.062 inches toward the outside of the chuck 22, moving the wires 42 axially over to the next wind position.

Both the chuck drive servo motor and a guide motor that drives a linear actuator are controlled by an multi-axis controller. In the preferred embodiment, the multi-axis controller is available from Ormec. The chuck drive servo motor and the wire guide motor are linked under software control to perform different turn and build routines depending on the particular bead configuration desired.

The first, second and third revolution of the forming wheel are made at a first tension level in the wire. The first tension level is created by setting the magnetic particle brake at a first resistance level. The resistance of the magnetic particle brake at the first resistance level is matched by the resistance provided by the gripper finger. The first resistance level provides between 0 lbs and 5 lbs of force on the wire.

During the fourth revolution of the forming wheel, the programmable logic controller energizes the magnetic particle brake to a second resistance level and the tension in the bead wire 42 is increased toward a preset limit, a second resistance level. The second resistance level has force levels of between 15 lbs and 30 lbs on the wire 42. The increased resistance of the brake is resisted by not only the gripper finger but also by the friction of the four revolutions of wire about the forming wheel. By initially winding the first few revolutions of the wire at the lower first tension level, wear on the gripper finger is minimized.

The fifth revolution is the same for both motors. During the sixth revolution, the linear actuator, on program command from the multi-axis controller, changes direction and moves the wire guide assembly 27 axially toward the inside of the chuck 22. The process is repeated until the programmed build sequence is finished.

At the end of the programmed build sequence, the forming wheel is stopped, a cutter knife 31 is forced down by a cylinder 32, cutting the bead wires 42 at point 33 releasing the leading ends of the wires from the forming wheel. The cutter knife 31 then retracts and programmable logic controller commands the chuck 22 to move 70 degrees in the counterclockwise direction, jamming a cut trailing end of the wires 42 into a bead bundle. The programmable logic controller then commands the jammer 29 and the wire guide 26 to retract. The chuck 22 is rotated 70 degrees in the clockwise direction, putting the chuck in position for the next build sequence. The programmable logic controller then commands the chuck 22 to collapse and the completed tire beads are removed from the chuck, ready for the process to be repeated and more beads to be built.

The above-described process is for building hex beads. Should the operator of the apparatus 40 wish to build strap type beads, the apparatus 40 and process should be modified as follows. The operator would change the dies (not shown) and inserts (not shown) in the extruder head (not shown) to add the appropriate number of bead wires 42 to build the number and configuration of beads desired. Next, the operator would select the appropriate build program on the multi-axis controller terminal. For hex beads, the operator selects a build code such as 5×7×5. For strap beads, the operator would select a code related to the number of turns, such as "4 turns." The operator would then remove the hex chuck 22 by removing a center attachment bolt (not shown) and inserting a puller. This removes the chuck 22 from a tapered drive shaft ( not shown). Next the operator disconnects four quick-disconnect air lines (not shown) from the chuck 22 to the main base (not shown). The appropriately-sized strap bead chuck 22 would then be attached to the main drive shaft by means of the center attachment bolt and the four air lines reattached. The operator would then remove the slitter assembly 12 by removing one attachment bolt (not shown) and installing in its place a slitter assembly 12 for strap beads. Next, the operator would remove the wire advance 18 by removing its one attachment bolt and replacing it with the appropriate strap bead wire advance 18. Next, the operator would remove the jammer roll 29. The wire guide assembly 27 does not have to be removed, since it is disabled in strap bead operation. The apparatus 40 is now ready to build strap beads.

The apparatus 40 is also capable of building beads of differing diameters. The operator needs to simply mount a chuck 22 of proper diameter and adjust a backplate up or down by means of an adjusting screw mounted between the backplate and the main frame on a line parallel with line designated by reference number 35.

Turn combinations are selected by means of the multi-axis controller interface terminal. The operator of the apparatus 40 pages through the available turn and build combinations on the terminal display until the desired one is displayed and selected.

While a certain representative embodiment and details have been shown for the purpose of illustrating the invention, it will be apparent to those skilled in the art that there is changes and modifications may be made therein without departing from the spirit or scope of the invention.

What is claimed is:

1. Apparatus for making tire beads on a forming wheel from a ribbon having a plurality of parallel wires coated with a resilient elastomeric material connecting said wires with webs of said material comprising:

a. a braking pulley for supplying and controlling tension in said ribbon;

b. a slitter positioned between said braking pulley and said forming wheel for cutting said webs between said wires;

c. means for clamping said wires and guiding them to said forming wheel;

d. means for clamping the ends of said wires on said forming wheel and helically winding separate bead bundles one from each wire under an initial low tension during the initial winding and at a higher tension after said initial winding by actuation of said braking pulley;

e. means for cutting said wires and jamming the cut end of each wire into its bundle thereby completing said beads; and, f. means for removing said beads from said forming wheel.

2. The apparatus of claim 1 wherein said braking pulley includes a magnetic particle brake.

3. The apparatus of claim 1 wherein said braking pulley includes a programmable logic controller.

4. The apparatus of claim 1 wherein said braking pulley is selectably adjustable to provide a first level of resistance and a second level of resistance, said first level of resistance for creating a first tension level in said wire and said second level of resistance for creating a second tension level in said wire.

5. The apparatus of claim 4 wherein said first resistance level is between 0 and 5 pounds of force on said wire.

6. The apparatus of claim 4 wherein said second resistance level is between 15 and 30 pounds of force on said wire.

* * * * *